United States Patent
Eom et al.

(10) Patent No.: US 8,799,486 B2
(45) Date of Patent: Aug. 5, 2014

(54) SYSTEM AND METHOD FOR TRANSFERRING A SESSION BETWEEN MULTIPLE CLIENTS

(75) Inventors: Hyeon-Sang Eom, Seoul (KR);
Sung-Jin Park, Suwon-si (KR);
Seung-Yong Lee, Seoul (KR);
Kyung-Tak Lee, Yongin-si (KR)

(73) Assignees: Samsung Electronics Co., Ltd (KR);
Seoul National University Industry Foundation (KR)

( * ) Notice: Subject to any disclaimer, the term of this patent is extended or adjusted under 35 U.S.C. 154(b) by 242 days.

(21) Appl. No.: 12/990,749

(22) PCT Filed: Apr. 28, 2009

(86) PCT No.: PCT/KR2009/002212
§ 371 (c)(1),
(2), (4) Date: Nov. 2, 2010

(87) PCT Pub. No.: WO2009/134051
PCT Pub. Date: Nov. 5, 2009

(65) Prior Publication Data
US 2011/0047280 A1 Feb. 24, 2011

(30) Foreign Application Priority Data

May 2, 2008 (KR) .......... 10-2008-0041340

(51) Int. Cl.
*G06F 15/16* (2006.01)
(52) U.S. Cl.
USPC ............ 709/228; 709/230; 709/231; 709/232

(58) Field of Classification Search
USPC ............... 709/201–203, 206–207, 226–232, 709/220–222, 237
See application file for complete search history.

(56) References Cited

U.S. PATENT DOCUMENTS

| 6,980,802 B2 | 12/2005 | Jung |
| 7,099,946 B2 | 8/2006 | Lennon et al. |

(Continued)

FOREIGN PATENT DOCUMENTS

| CN | 1656453 | 8/2005 |
| EP | 1 696 860 | 9/2006 |

(Continued)

OTHER PUBLICATIONS

PCT/ISA/237 Written Opinion issued in PCT/KR2009/02212 (6pp).

(Continued)

*Primary Examiner* — Huy D Vu
*Assistant Examiner* — Kuo T Chiang
(74) *Attorney, Agent, or Firm* — The Farrell Law Firm, P.C.

(57) ABSTRACT

A method for transferring a session between clients is provided when one user uses multiple clients on a service (for example, Push to talk over Cellular (PoC), Instant Messaging (IM), Converged-Internet Protocol (IP) Messaging (CPM)) providing system implemented through a Session Initiation Protocol (SIP)/IP core network. A session transfer method is provided when the user needs to transfer a session to another client while the session is performed through one client. A "temporary storing" technique is used in which a conversation server or client as one of elements of a seamless CPM system for providing a seamless user environment temporarily stores data transmitted from another user during session transfer.

8 Claims, 12 Drawing Sheets

(56) References Cited

U.S. PATENT DOCUMENTS

| | | | |
|---|---|---|---|
| 7,191,233 B2* | 3/2007 | Miller | 709/227 |
| 7,356,567 B2 | 4/2008 | Odell et al. | |
| 7,599,476 B2* | 10/2009 | Pantana et al. | 379/88.13 |
| 2003/0055977 A1 | 3/2003 | Miller | |
| 2003/0154398 A1 | 8/2003 | Eaton et al. | |
| 2006/0064307 A1 | 3/2006 | Pakkala | |
| 2006/0259631 A1 | 11/2006 | Gargi | |
| 2007/0094490 A1 | 4/2007 | Lohr | |
| 2008/0025479 A1 | 1/2008 | Pantana et al. | |
| 2009/0017856 A1* | 1/2009 | Albertsson et al. | 455/518 |
| 2009/0067408 A1* | 3/2009 | Leppainen et al. | 370/350 |
| 2009/0150562 A1* | 6/2009 | Kim et al. | 709/238 |

FOREIGN PATENT DOCUMENTS

| | | |
|---|---|---|
| EP | 1 810 472 | 7/2007 |
| WO | WO 2005/065163 | 7/2005 |
| WO | WO 2006/045323 | 5/2006 |
| WO | WO 2006/067278 | 6/2006 |

OTHER PUBLICATIONS

Open Mobile Alliance, "Converged IP Messaging", Work Item Document, OMA-WID_0135-CPM-V1_0-20060510-A, 2006.

Open Mobile Alliance, "Converged IP Messaging Requirements", Approved Version 1.0, OMA-RD-CPM-V1_0-20120612-A, Jun. 12, 2012.

Open Mobile Alliance, "Converged IP Messaging Architecture", Approved Version 1.0, OMA-AD-CPM-V1_0-20120612-A, Jun. 12, 2012.

J. Rosenberg et al., "SIP: Session Initiation Protocol," Network Working Group, Request for Comments: 3261, Jun. 2002.

B. Campbell et al., "The Message Session Relay Protocol (MSRP)," Network Working Group, Request for Comments: 4975, Sep. 2007.

M. Crispin, "Internet Message Access Protocol—Version 4rev1," Network Working Group, Request for Comments: 3501, Mar. 2003.

* cited by examiner

SYSTEM AND METHOD FOR TRANSFERRING A SESSION BETWEEN MULTIPLE CLIENTS

PRIORITY

This application claims the benefit under 35 U.S.C. §119 (a) of a Korean Patent Application filed in the Korean Intellectual Property Office on May 2, 2008, assigned Serial No. 10-2008-0041340, and to PCT/KR2009/002212 filed Apr. 28, 2009, the disclosure of each of which is hereby incorporated by reference

TECHNICAL FIELD

The present invention relates generally to a service providing method and system implemented through a Session Initiation Protocol/Internet Protocol (SIP/IP) core network, and in particular, to a method and system for transferring a session between multiple clients.

BACKGROUND ART

In an existing mobile environment, terminals transmit sporadic messages of Short Message Service (SMS), Multimedia Messaging Service (MMS), etc. On the other hand, users may need a messaging service to easily exchange a conversation using an MSN messenger in a wired environment. Thus, an instant messaging service has been introduced into terminals and networks on the basis of an SIP/IP core network. According to the demand of customers and enterprises for Push To Talk (PTT) (that is, walkie-talkie), a PTT over Cellular (PoC) service and system based on the SIP/IP core network have been developed. According to rapid variation of markets for enterprises, communication businesses, etc., the desire of users to integrate and process various types of messages is increasing. In consideration of this point, a standard technology is being developed for service Converged IP Messaging (CPM) implemented through the SIP/IP core network in the standard organization called Open Mobile Alliance (OMA). The CPM is intended to allow a user to experience a seamless messaging service environment by integrating IP-based messaging services. Accordingly, the implementation of interworking between a CPM service and a non-CPM service is needed such that a service disconnection is not perceived in any messaging service. One of many features of the above-described CPM service is that multi-client environments can be provided to users.

DISCLOSURE OF INVENTION

Technical Problem

There is the case where the user needs to transfer a session to another client while the session is performed through one client even when one user accesses a service by simultaneously using multiple clients through the above-described method. In this case, a proper session transfer method and system are needed.

Accordingly, a method and system that can transfer a session in a messaging service providing system implemented through an SIP/IP core network are needed.

Technical Solution

An aspect of the present invention is to address at least the problems and/or disadvantages and to provide at least the advantages described below. Accordingly, an aspect of the present invention is to provide a method and system for transferring a session from one client to another client when one user uses multiple clients.

According to an aspect of the present invention, there is provided a converged messaging service providing system for transferring a session between multiple clients, including: a first client that requests session transfer to a second client; a message & media storage that stores a session history; and a conversation server that temporarily stores a message from a third client of another user when the session transfer request exists, acquires a session history from the message & media storage, generates a session with the second client, and transmits the temporarily stored message and the session history to the second client when the session is generated completely.

According to an aspect of the present invention, there is provided a converged messaging service providing system for transferring a session between multiple clients, including: a first client that requests session transfer to a second client; a message & media storage that stores a session history; a conversation server that temporarily stores a message from a third client of another user when the session transfer request exists, generates a session with the second client, and commands to generate a session between the second client and the message & media storage after transmitting the temporarily stored message to the second client when the session is generated completely; and the second client that generates a session with the message & media storage in response to the session generation command and acquires a session history from the message & media storage.

According to an aspect of the present invention, there is provided a method for transferring a session between multiple clients in a converged messaging service providing system, including: requesting session transfer from a first client to a second client; temporarily storing, by a converged server, a message from a third client when the session transfer request exists; acquiring, by the converged server, a session history from a message & media storage; generating, by the converged server, a session with the second client; and transmitting, by the converged server, the temporarily stored message and the session history to the second client when the session is generated completely.

According to an aspect of the present invention, there is provided a method for transferring a session between multiple clients in a converged messaging service providing system, including: requesting session transfer from a first client to a second client; temporarily storing, by a converged server, a message from a third client when the session transfer request exists; generating, by the converged server, a session with the second client; transmitting, by the converged server, the temporarily stored message to the second client when the session is generated completely; acquiring, by the converged server, a session history from a message & media storage; and transmitting, by the converged server, the session history to the second client.

According to an aspect of the present invention, there is provided a method for transferring a session between multiple clients in a converged messaging service providing system, including: requesting session transfer from a first client to a second client; temporarily storing, by a converged server, a message from a third client when the session transfer request exists; generating, by the converged server, a session with the second client and transmitting the temporarily stored message to the second client when the session is generated completely; commanding, by the converged server, to generate a session between the second client and a message & media storage; generating, by the second client, a session with the message & media storage in response to the session generation command; and acquiring, by the second client, a session history from the message & media storage.

Advantageous Effects

According to exemplary embodiments of the present invention, session transfer is naturally performed without lost content by temporarily storing and transmitting a session history and a message of a counterpart user to a second client during the session transfer. In a target client to which the session has been transferred, a session history of an existing client is output to a screen, such that a user can continue a conversation while referring to existing conversation content. The user does not need to read conversation content from the screen of the previous client. User convenience can be improved using a CPM service.

BRIEF DESCRIPTION OF DRAWINGS

The above and other aspects, features and advantages of the present invention will become more apparent from the following detailed description when taken in conjunction with the accompanying drawings in which.

Throughout the drawings, the same drawing reference numerals will be understood to refer to the same elements, features and structures.

BEST MODE FOR CARRYING OUT THE INVENTION

Figure 1:
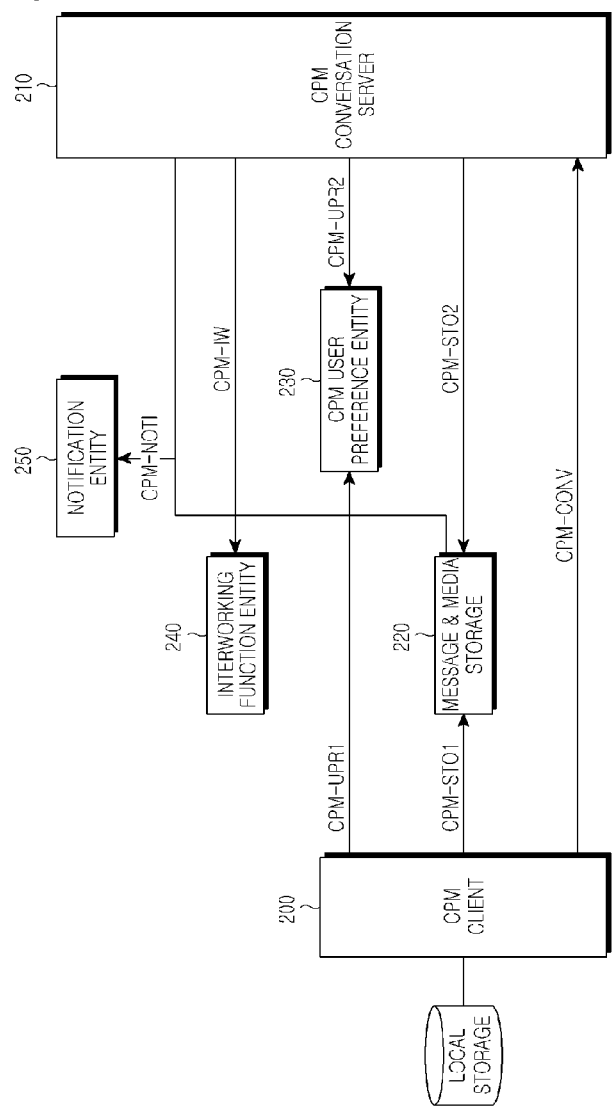
FIG. 1 is a configuration diagram of a CPM system according to an exemplary embodiment of the present invention.

Exemplary embodiments of the present invention will now be described in detail with reference to the annexed drawings.

In the drawings, the same or similar elements are denoted by the same reference numerals even though they are depicted in different drawings. In the following description, a detailed description of known functions and configurations incorporated herein has been omitted for clarity and conciseness.

In the present invention, an example of CPM messaging among messaging services implemented through an SIP/IP core network will be described. The present invention provides a method for transferring a session between clients when one user uses multiple clients on a service (for example, PoC, Instant Messaging (IM), or CPM) providing system implemented through an SIP/IP core network. In particular, the present invention provides a session transfer method when the user needs to transfer a session to another client while the session is performed through one client. The present invention uses a "temporary storing" technique in which a conversation server or client as one of elements of a seamless CPM system for providing a seamless user environment temporarily stores data transmitted from another user while the session is transferred.

Hereinafter, the configuration and operation of the CPM system according to an exemplary embodiment of the present invention will be described with reference to FIG. 1. In the exemplary embodiment of the present invention, an example of the CPM will be described, but the present invention is applicable to all services implemented through the SIP/IP core network such as PoC, IM, etc. For the session transfer according to the exemplary embodiment of the present invention, the CPM system includes a conversation server and a message & media storage. Specifically, referring to FIG. 1, the CPM system includes a CPM client 200, a CPM conversation server 210, a message & media storage 220, a CPM user preference entity 230, an interworking function entity 240, and a notification entity 250.

First, the CPM client 200 is a service requestor to generate a session with another CPM client through the CPM conversation server 210 and receive a service. The message & media storage 220 stores data to be exchanged in a session between the CPM clients. An operation for storing CPM session data is determined by user preferences stored in the CPM user preference entity 230. The constituent elements are mutually connected through interfaces. Among the interfaces, an interface between the CPM conversation server 210 and the CPM client 200 uses SIP, Message Session Relay Protocol (MSRP), and Real-time Transfer Protocol (RTP) as CPM-CONV.

Figure 2:
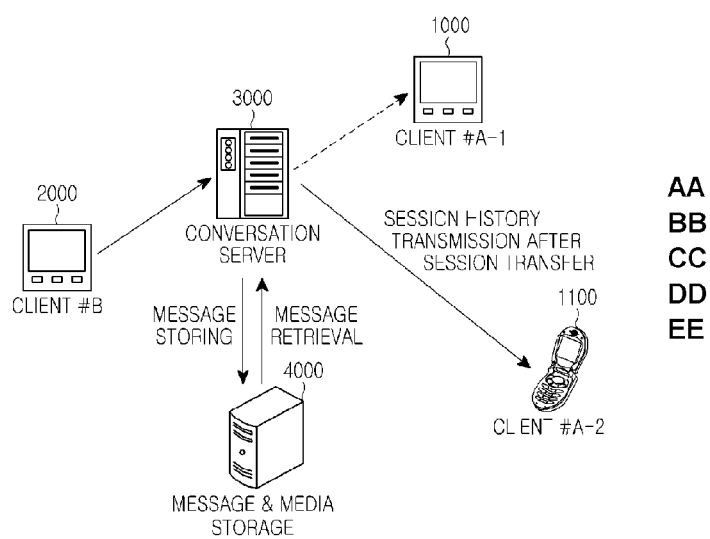
FIG. 2 illustrates an operation relation between CPM system elements for transferring a session according to an exemplary embodiment of the present invention.

The operation relation between the CPM system elements will be described with reference to FIG. 2. One user can use multiple clients. In FIG. 2, when a user A uses first and second clients and a user B uses a third client, a session transfer method between the first and second clients is proposed. Specifically, FIG. 2 schematically illustrates a process in which the user A attempts a client change to a client #A-2 1100 while a client #A-1 1000 exchanges data with a client #B 2000. In the present invention, the session transfer method is implemented such that the user B does not know the fact that the user A has made the client change. In the present invention, the session transfer is that in a messaging session and an additionally continuous media session. Here, the message session is the session for exchanging a message, file, photo, etc. between users. That is, it can be defined as a discontinuous media session. A concept as opposed thereto is a continuous media session like a video conferencing session or a voice chatting session for a voice conversation.

In the following description, it is assumed that the user A owns the client #A-1 1000 and the client #A-2 1100 and the user B owns the client #B 2000. Here, the client #A-1 1000 and the client #B 2000 are connected to a conversation server 3000 by the SIP session. The conversation server 3000 and a message & media storage 4000 use Internet Message Access Protocol 4 (IMAP4)/Lemonade protocol, such that the IMAP4/Lemonade protocol is used for message exchange with the message & media storage 4000. In the present invention, the message & media storage 4000 is additionally required to store a session history.

On the other hand, when the user A desires to attempt the client change to the client #A-2 1100, the client #A-1 1000 as a source device requests the conversation server 3000 to transfer the session. At this time, the client #A-1 1000 has its own client list and selects one of clients belonging to the user. For example, the client #A-1 1000 must request the conversation server 3000 to transfer the session after selecting the client #A-2 1100.

Upon receipt of a session transfer command, the conversation server 3000 temporarily stores data transmitted from the client #B 2000 and transmits the stored data to the client #A-2 1100 when the session transfer process is completed. At this time, a session history is stored in the message & media storage 4000. The client #A-2 1100 acquires the session history stored in the message & media storage 4000 through the conversation server 3000 or by directly accessing the message & media storage 4000. A session history transmission time and method are determined by the CPM user preference and service policy. Here, the session history is defined as a set of all types of data exchanged from a session start time to a current time. This session history can be managed by the message & media storage 4000 according to the CPM user preference and service policy or directly managed by the client #A-1 1000 as the originator device.

Hereinafter, in the detailed description of the present invention, the exemplary embodiments thereof are divided as follows.

A first exemplary embodiment of the present invention is a process in which the conversation server 3000 receives and temporarily stores a session history from the message & media storage 4000 when a session transfer command is generated and transmits the session history and a temporarily stored message to the client #A-2 1100 after the session with the client #A-2 1000 is generated, and the client #A-2 1100 outputs a transmission completion notification to a screen when the transmission is completed and resumes a conversation with the client #B 2000.

A second exemplary embodiment of the present invention is a process in which the conversation server 3000 temporarily stores a message to be transmitted to the client #A-2 1100 while a session with the client #A-2 1100 is generated, the temporarily stored message is transmitted to the client #A-2 1100 when the session is generated, the conversation is resumed between the client #A-2 1100 and the client #B 2000 when the transmission is completed, the conversation server 3000 requests the message & media storage 4000 to transmit a session history and receives and temporarily stores the session history, the session history is transmitted to the client #A-2 1100, and the session history is output to the screen of the client #A-2 1100.

A third exemplary embodiment of the present invention is the same as the second exemplary embodiment in terms of the process until a conversation is resumed between the client #A-2 1100 and the client #B 2000. In a subsequent process of the third exemplary embodiment, the conversation server 3000 commands the client #A-2 1100 to generate a session with the message & media storage 4000, and the client #A-2 1100 directly receives a session history through the generated session and outputs the received session history to the screen.

First, a session transfer flow according to the first exemplary embodiment of the present invention will be described with reference to FIG. 3.

Figure 3:
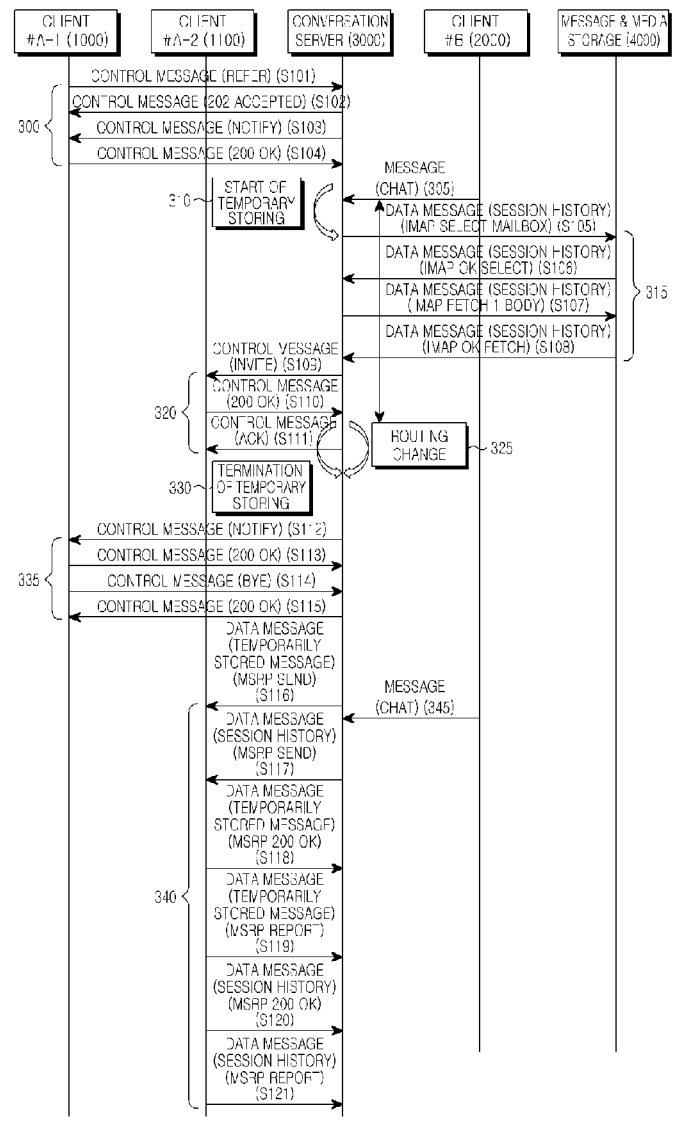
FIG. 3 illustrates a session transfer flow according to a first exemplary embodiment of the present invention.
Figures 14, 15:
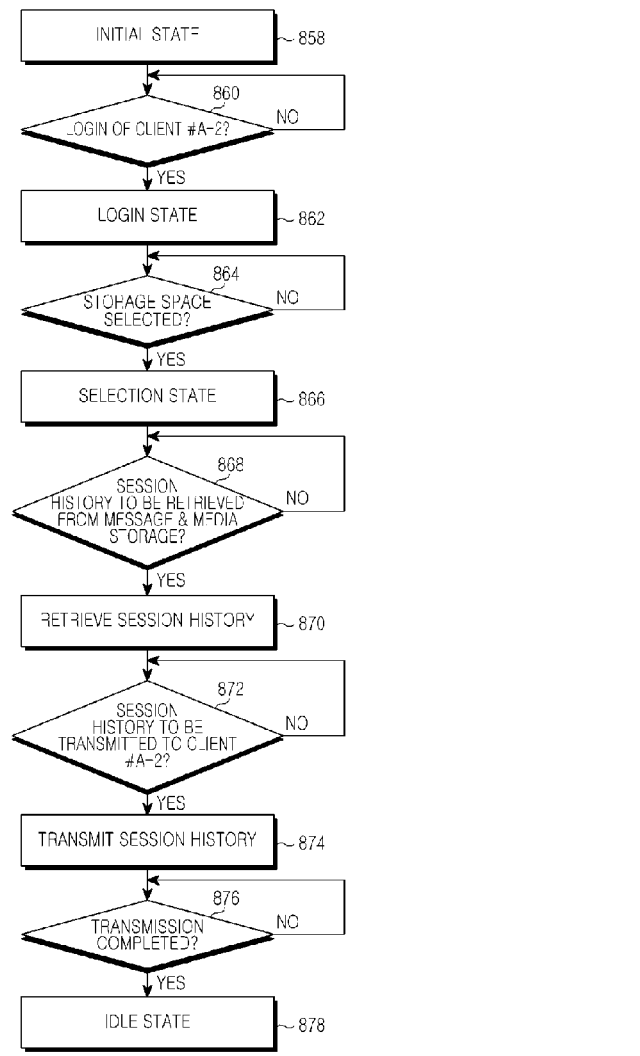
FIG. 14 is a state diagram of a message & media storage according to the third exemplary embodiment of the present invention.
FIG. 15 illustrates an SIP REFER message format according to an exemplary embodiment of the present invention.

Referring to FIG. 3, the client #A-1 1000 transmits a request for transferring a session to the client #A-2 1100 to the conversation server 3000 using an SIP REFER message as a control message (S101). The format of the SIP REFER message is illustrated in FIG. 15. Referring to FIG. 15, a Refer-To header field P1 indicates destination address information. To transfer the session from the client #A-1 1000 to the client #A-2 1100, an SIP URI address of the client #A-2 1100 is indicated. The REFER message includes attribute information indicating that the REFER message to be currently transmitted is used for the session transfer. Accordingly, SESSION TRANSFER P2 is indicated by a Session Description Protocol (SDP) attribute parameter. Upon acquisition of the REFER message, the conversation server 3000 uses an ACCEPTED message to indicate whether the REFER message has been received (S102). To notify that a REFER event occurs in the conversation server 3000, the conversation server 3000 transmits a NOTIFY message to the client #A-1 1000 (S103). The client #A-1 1000 returns an OK message in response to the NOTIFY message (S104). The above-described steps S101 to S104 indicated by reference numeral 300 are a process in which the client #A-1 1000 requests the conversation server 3000 to transfer the session.

Then, the conversation server 3000 performs the following session transfer procedure. Specifically, when the session transfer is performed, the conversation server 3000 temporarily stores data, for example, messages 305, to be transmitted from the user B to the user A. In other words, during the session transfer, a temporary storing operation 310 is started such that data from the user B to the user A is transmitted to the client #A-2 1100 of the user A without loss.

The conversation server 3000 selects a storage space of the user A within the message & media storage 4000 using an IMAP SELECT message (S105). At this time, the conversation server 3000 uses an IMAP protocol to acquire a session history stored in the message & media storage 4000. Then, the message & media storage 4000 returns an OK FETCH message in response to the storage space selection by the conversation server 3000 (S106). Subsequently, the conversation server 3000 transmits an IMAP FETCH message to retrieve the session history stored in the message & media storage 4000 (S107). The message & media storage 4000 transmits the session history to the conversation server 3000 and the conversation server 3000 temporarily stores the session history in its own storage space (S108). The above-described steps S105 to S108 indicated by reference numeral 315 are a process in which the conversation server 3000 retrieves and receives the session history from the message & media storage 4000.

Subsequently, the conversation server 3000 makes a notification of a newly generated session with the client #A-2 1100 using an INVITE message (S109). The client #A-2 1100 returns an OK message in response to the INVITE message (S110). Then, the conversation server 3000 returns an ACK message in response to the OK message (S111). The above-described steps S109 to S111 indicated by reference numeral 320 are a new SIP session generation process.

When the session with the client #A-2 1100 is generated completely, a routing change 325 is made such that the conversation server 3000 connects the conversation with the user B to the client #A-2 1100. That is, routing setup is changed to transmit data from the client #B 2000 to the client #A-2 1100. At a routing change point, the conversation server 3000 terminates an operation for temporarily storing data received from the client #B 2000 as indicated by reference numeral 330.

Then, the conversation server 3000 notifies the client #A-1 1100 of REFER event termination using a NOTIFY message (S112). The client #A-1 1000 returns an OK message to the conversation sever 3000 in response to the NOTIFY message (S113). The client #A-1 1000 notifies the conversation sever 3000 of existing session termination (S114). The conversation server 3000 transmits the OK message to confirm the session termination (S115). Accordingly, the session with the client #A-1 1100 is terminated through steps S112 to S115 indicated by reference numeral 335.

Then, the conversation server 3000 transmits a session history and a temporarily stored message to the client #A-2 1100 using the MSRP protocol (S116 and S117). In response thereto, the client #A-2 1100 returns an OK message to the conversation server 3000 (S118 and S120). When the session history and the temporarily stored message are transmitted completely, the client #A-2 1100 notifies the conversation server 3000 of transmission completion using an MSRP REPORT message (S119 and S121). Through the above-described steps S116 to S121, the client #A-2 1100 outputs the temporarily stored message and the session history received from the conversation server 3000 to the screen. Accordingly, the conversation server 3000 receives data, for example, messages, from the user B to the user A, such that the conversation with the client #B 2000 is continued.

Hereinafter, the operation of constituent elements of the CPM system operating as illustrated in FIG. 3 will be described with reference to FIGS. 4 to 7.

Figure 4:
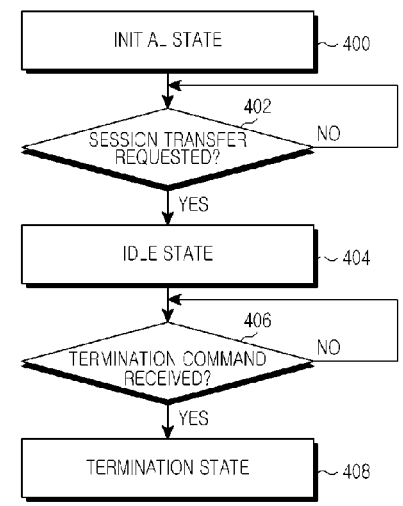
FIG. 4 is a state diagram of a client #A-1 according to the first exemplary embodiment of the present invention.

FIG. 4 illustrates the state variation of the client #A-1 1000 according to the first exemplary embodiment of the present invention. When the client #A-1 1000 of an initial state in step 400 requests the conversation server 3000 to transfer a session in step 402, the transition to an idle state is made in step 404. Then, when a termination command to terminate an existing session is received from the conversation server 3000 in step 406, the transition to a termination state is made in step 408.

Figure 5:
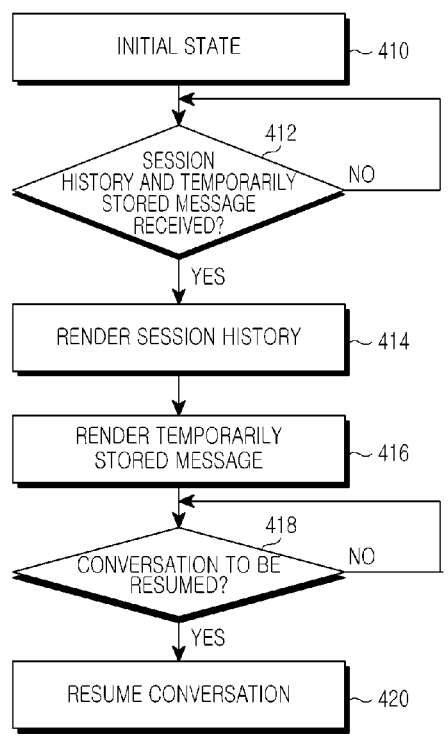
FIG. 5 is a state diagram of a client #A-2 according to the first exemplary embodiment of the present invention.

FIG. 5 illustrates the state variation of the client #A-2 1100. When the client #A-2 1100 of an initial state in step 410 receives a temporarily stored message and a session history from the conversation server 3000 in step 412, the session history and the temporarily stored message are rendered in steps 414 and 416. Subsequently, when the conversation with the client #B 2000 is resumed in step 418, the transition to a conversation resumption state is made in step 420.

Figure 6:
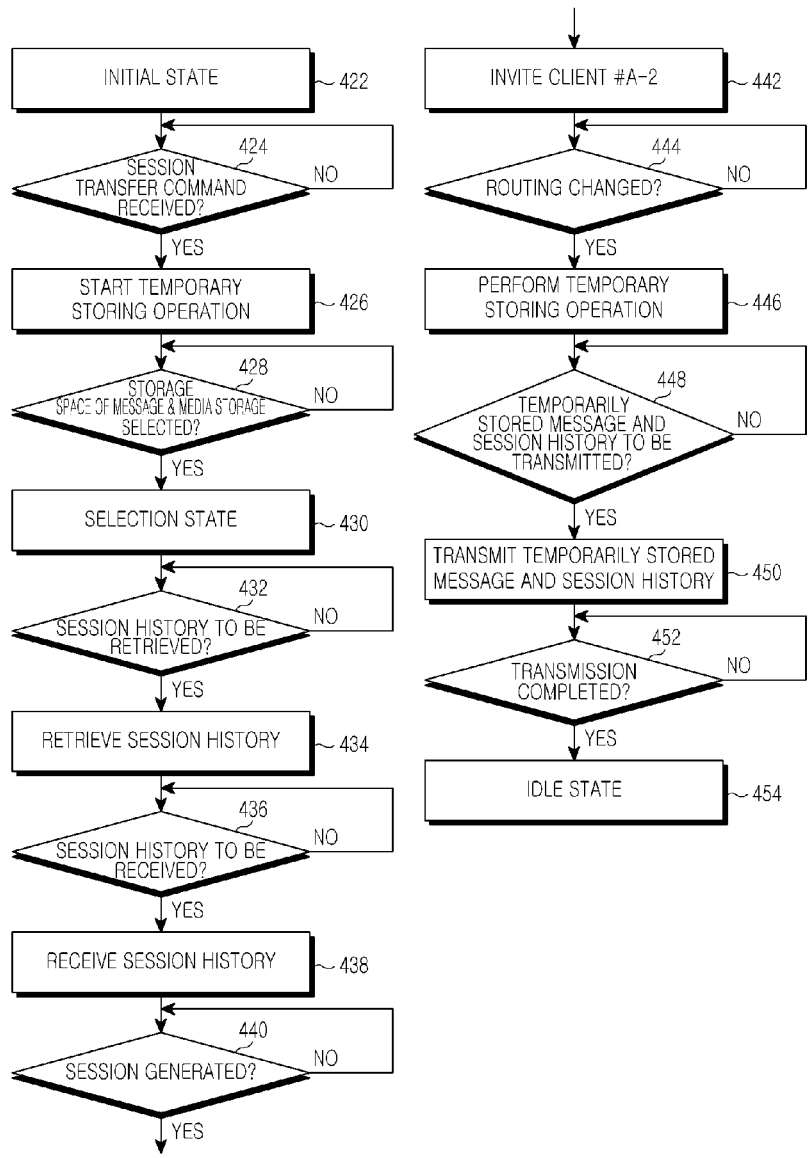
FIG. 6 is a state diagram of a conversation server according to the first exemplary embodiment of the present invention.

FIG. 6 illustrates the state variation of the conversation server 3000. When the conversation server 3000 of an initial state in step 422 receives a session transfer command from the client #A-1 1000 in step 424, a temporary storing operation is started in step 426. Subsequently, when a storage space of the message & media storage 4000 is selected in step 428, an operation is performed in a selection state in step 430. When a session history retrieval operation must be performed in the message & media storage 4000 in step 432, a session history is retrieved in step 434. Accordingly, when the session history within the message & media storage 4000 is received in step 436, an operation is performed in a session history reception state to receive the session history in step 438. Then, when the session with the client #A-2 1100 is generated in step 440, an operation for inviting the client #A-2 1100 is performed in step 442. Then, when a routing change to the client #A-2 1100 is made in step 444, the conversation server 300 performs a temporary storing operation in step 446. Thereafter, when the temporarily stored message and the session history must be transmitted to the client #A-2 1100 in step 448, an operation is performed in a state for transmitting the temporarily stored message and the session history in step 450. Then, when the transmission is completed in step 452, the conversation server 3000 operates in an idle state in step 454.

Figure 7:
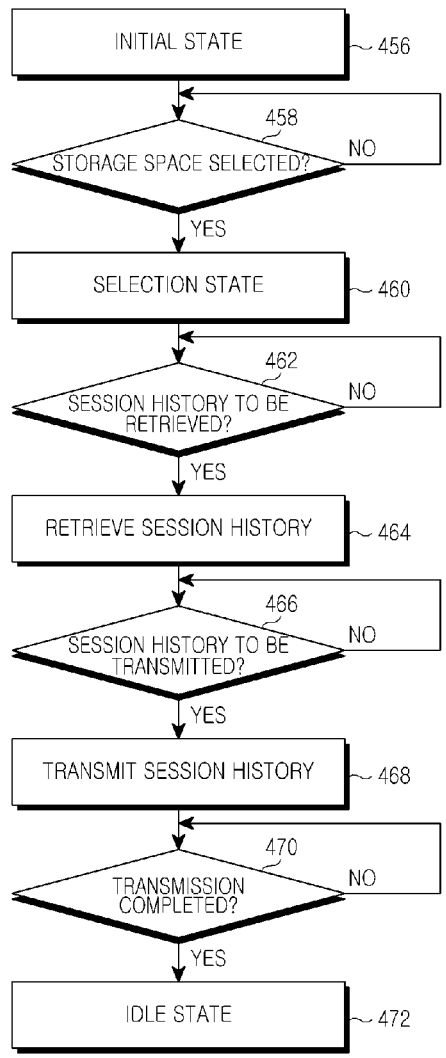
FIG. 7 is a state diagram of a message & media storage according to the first exemplary embodiment of the present invention.

FIG. 7 illustrates the state variation of the message & media storage 4000. When the message & media storage 4000 is in an initial state in step 456 and a storage space within the message & media storage 4000 is selected in step 458, it proceeds to step 460 to perform an operation in a selection state. Subsequently, when a session history is retrieved from the message & media storage 4000 in step 462, an operation is performed in a session history retrieval state in step 464. Then, when the message & media storage 4000 must transmit the retrieved session history to the conversation server 3000 in step 466, an operation for transmitting the session history is performed in step 468. When the transmission is completed in step 470, an operation is performed in an idle state in step 472.

In the case of source device initiated session transfer in which a session history is received in a foreground manner according to the first exemplary embodiment of the present invention as described above, a process for outputting a session history and a temporarily stored message to the screen of the client #A-2 1100 and resuming the conversation with the client #B 2000 is performed. Accordingly, the present invention can minimize the inconvenience due to the session transfer since the user A continues the conversation through the client #A-2 1100, and can provide user convenience since a waiting time of the user B due to the session transfer of the user A is minimized.

Hereinafter, a session transfer flow according to the second exemplary embodiment of the present invention will be described with reference to FIG. 8. The operation of steps S201 to S204 of FIG. 8 as indicated by reference numeral 500 is the same as that of steps S101 to S104 of FIG. 3. An operation 515 for temporarily storing a message 510 received from the client #B 2000 is started. During this operation, the conversation server 3000 performs an operation for generating a session with the client #A-2 1100. The operation of steps S205 to S207 as indicated by reference numeral 520 is the same as that of steps S109 to S111 of FIG. 3 as indicated by reference numeral 320. Since a routing change operation 525 and a temporary storage termination operation 530 are the same as those as indicated by reference numerals 325 and 330 of FIG. 3, their description is omitted. Steps S208 to S211 as indicated by reference numeral 535 are the same as steps S112 to S115 of FIG. 3 as indicated by reference numeral 335.

Figure 8:
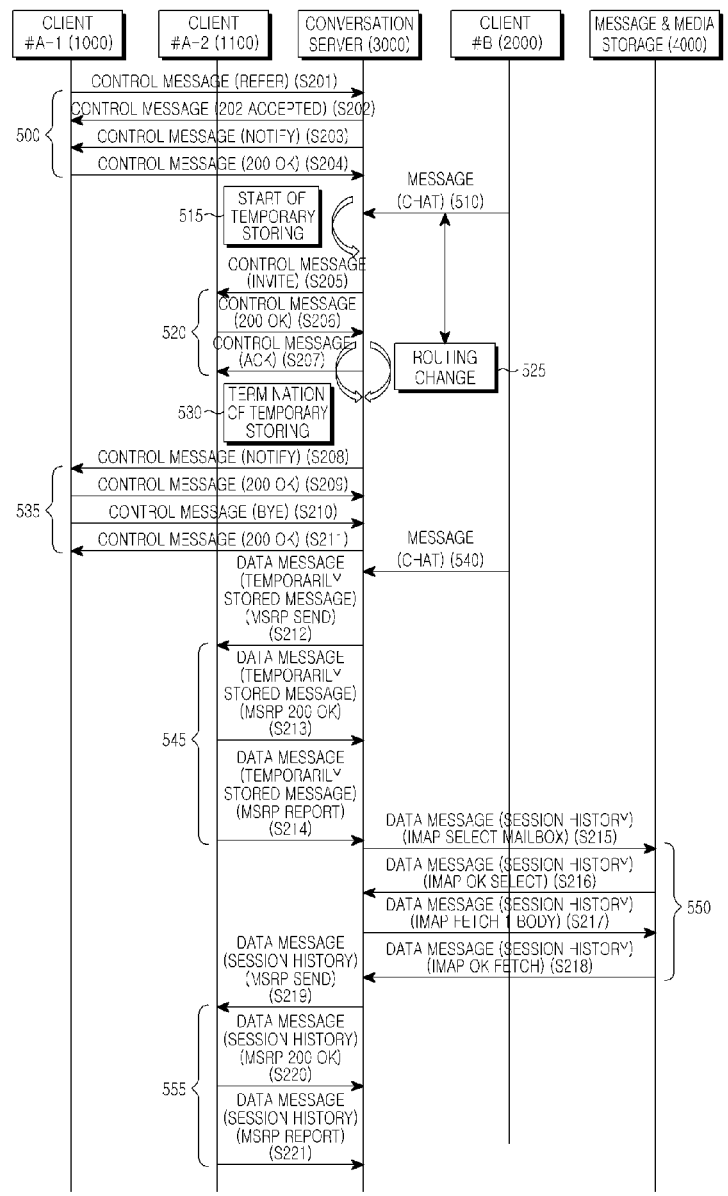
FIG. 8 illustrates a session transfer flow according to a second exemplary embodiment of the present invention.

In this regard, the process of FIG. 3 in which the conversation server 3000 receives a session history from the message & media storage 4000 and then transmits both a temporarily stored message and the session history to the client #A-2 1100 is performed, while the process of FIG. 8 in which the conversation server 3000 first transmits the temporarily stored message to the client #A-2 1100 and then transmits the session history from the message & media storage 4000 to the client #A-2 1100 is performed. As described above, when the client #A-2 1100 receives the temporarily stored message from the conversation server 3000, the message can be output to the screen, such that the conversation with the client #B 2000 is continued.

Accordingly, when the conversation server 3000 transmits the temporarily stored message in steps S212 to S214 as indicated by reference numeral 545, the session history is received from the message & media storage 4000 in steps S215 to S218 as indicated by reference numeral 550. Here, the operation of steps S212 to S214 as indicated by reference numeral 545 is the same as that of steps S116, S118, and S119 of FIG. 3, and the operation of steps S215 to S218 as indicated by reference numeral 550 is the same as that of steps S105 to S108 of FIG. 3 as indicated by reference numeral 315. An operation in which the conversation server 3000 transmits the session history to the client #A-2 1100 in steps S219 to S221 as indicated by reference numeral 555 is the same as that of steps S117, S120, and S121 of FIG. 3. When the session history is received, the client #A-2 1100 outputs the received session history to the screen.

The operation of constituent elements of the CPM system operating as illustrated in FIG. 8 will be described with reference to FIGS. 9 and 10. Since the state variation of the client #A-1 1000 requesting the session transfer and the state variation of the message & media storage 4000 are the same as those of FIGS. 4 and 7, their description is omitted.

Figure 9:
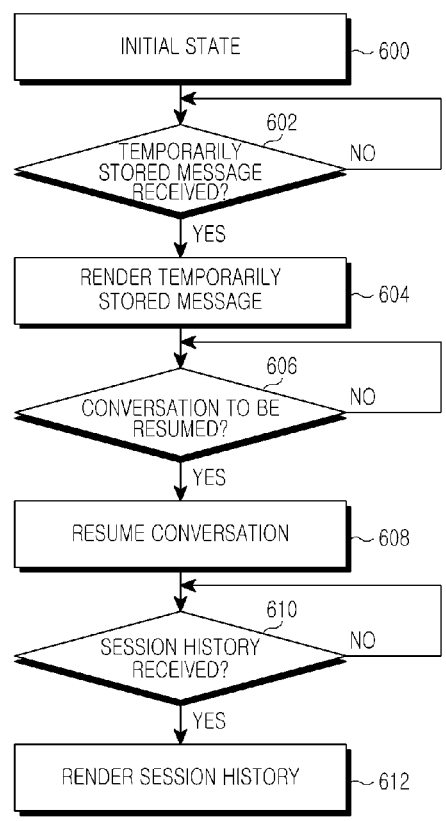
FIG. 9 is a state diagram of a client #A-2 according to the second exemplary embodiment of the present invention.

FIG. 9 illustrates the state variation of the client #A-2 1100. When the client #A-2 1100 of an initial state in step 600 receives a temporarily stored message from the conversation server 3000 in step 602, the temporarily stored message is rendered in step 604. Subsequently, when the conversation with the client #B 2000 is resumed in step 606, the transition to a conversation resumption state is made in step 608. Then, when the client #A-2 1100 receives a session history from the conversation server 3000 in step 610, the session history is rendered in step 612.

Figure 10:
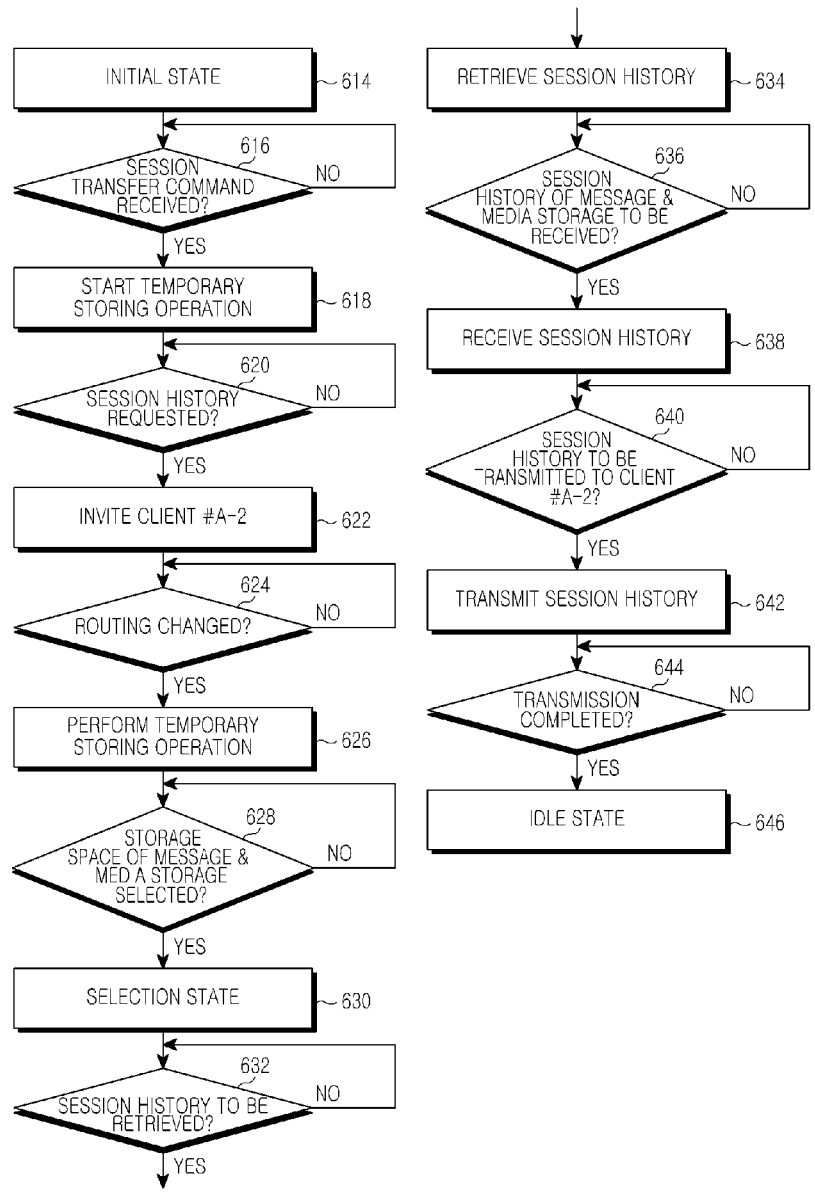
FIG. 10 is a state diagram of a conversation server according to the second exemplary embodiment of the present invention.

FIG. 10 illustrates the state variation of the conversation server 3000. When the conversation server 3000 of an initial state in step 614 receives a session transfer command from the client #A-1 1000 in step 616, a temporary storing operation is started in step 618. After pre-requesting the message & media storage 4000 to provide the session history in step 620, the conversation server 3000 invites the client #A-2 1100 in step 622. Then, when a routing change to the client #A-2 1100 is made in step 624, the conversation server 3000 performs a temporary storing operation in step 626. Subsequently, when a storage space of the message & media storage 4000 is selected in step 628, the conversation server 3000 operates in a selection state in step 630. When a session history retrieval operation must be performed in the message & media storage 4000 in step 632, a session history is retrieved in step 634. Accordingly, when the session history within the message & media storage 4000 is received in step 636, an operation is performed in a session history reception state to receive the session history in step 638. Then, when the temporarily stored message and the session history must be transmitted to the client #A-2 1100 in step 640, the session history is transmitted in step 642. When the transmission is completed in step 644, an operation is performed in an idle state in step 646.

Figure 11:
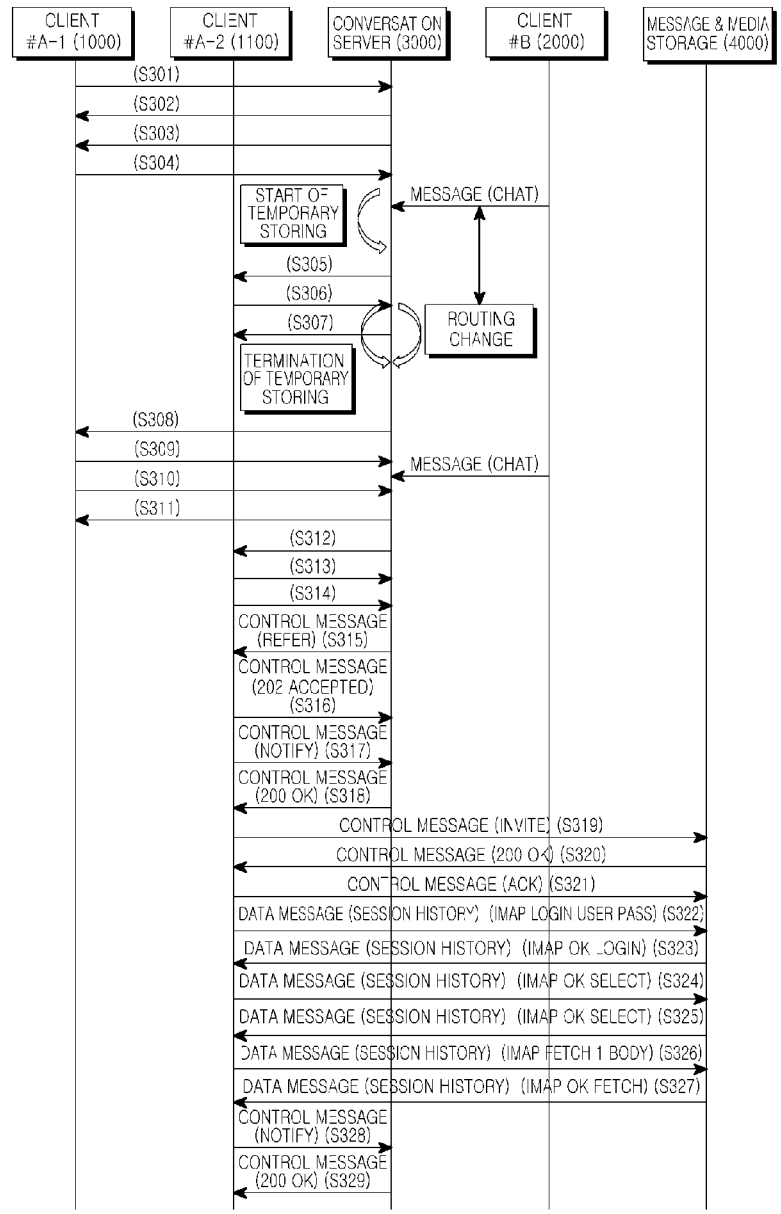
FIG. 11 illustrates a session transfer flow according to a third exemplary embodiment of the present invention.

Hereinafter, a session transfer flow according to the third exemplary embodiment of the present invention will be described with reference to FIG. 11. An operation for transmitting the temporarily stored message in steps S301 to S314 of FIG. 11 is the same as that of steps S201 to S214 of FIG. 8. In this regard, in FIG. 11, a process in which the client #A-2 directly accesses the message & media storage 4000 and directly acquires a session history without passing through the conversation server 3000 is performed.

Accordingly, the client #A-2 1100 must newly generate a session with the message & media storage 4000. The conversation server 3000 makes a command for generating a session between the client #A-2 1100 and the message & media storage 4000 using a REFER message (S315). Upon acquisition of the REFER message, the client #A-2 1100 uses an ACCEPTED message to indicate whether the REFER message has been received (S316). To notify that a REFER event operates in the client #A-2 1100, the client #A-2 1100 transmits a NOTIFY message to the conversation server 3000 (S317). The conversation server 3000 returns an OK message in response to the NOTIFY message (S318).

Then, the client #A-2 1100 transmits an INVITE message to generate a session with the message & media storage 4000 (S319). The message & media storage 4000 returns an OK message in response to the INVITE message (S320). In response to the OK message, an ACK message is returned to the message & media storage 4000 (S321). Accordingly, a session between the client #A-2 1100 and the message & media storage 4000 is generated completely and the client #A-2 1100 can receive a session history through the session.

On the other hand, the client #A-2 1100 uses an IMAP protocol to acquire a session history stored in the message & media storage 4000. The client #A-2 1100 uses an IMAP LOGIN message for user login in the message & media storage 4000 (S322). The client #A-2 1100 receives an OK LOGIN message from the message & media storage 4000 (S323). The client #A-2 1100 selects a storage space of the user A of the message & media storage 4000 using an IMAP SELECT message (S324). The message & media storage 4000 returns a response to the selection of the storage space of the client #A-2 1100 (S325). The client #A-2 1100 transmits an IMAP FETCH message to retrieve the session history stored in the message & media storage 4000 (S326). The message & media storage 4000 transmits the session history to the client #A-2 1100 (S327).

The client #A-2 1100 notifies the conversation server 3000 of REFER EVENT termination using a NOTIFY message (S328). The conversation server 3000 returns a response to the NOTIFY message to the client #A-2 1100 (S329).

The operation of constituent elements of the CPM system operating as illustrated in FIG. 11 will be described with reference to FIGS. 12 to 14. Here, since the state variation of the client #A-1 1000 requesting the session transfer is the same as that of FIG. 4, its description is omitted.

Figure 12:
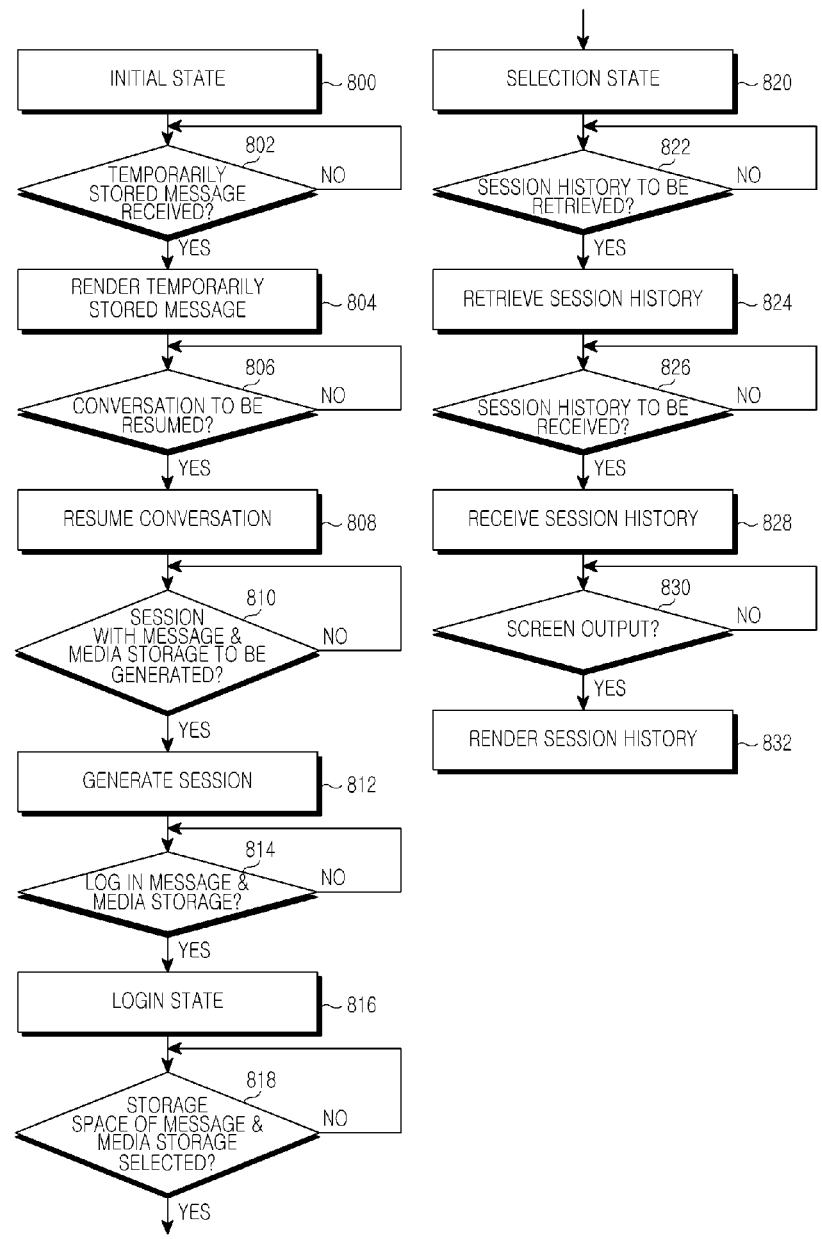
FIG. 12 is a state diagram of a client #A-2 according to the third exemplary embodiment of the present invention.

FIG. 12 illustrates the state variation of the client #A-2 1100. When the client #A-2 1100 of an initial state in step 800 receives a temporarily stored message from the conversation server 3000 in step 802, the temporarily stored message is rendered in step 804. Subsequently, when the conversation with the client #B 2000 is resumed in step 806, the transition to a conversation resumption state is made in step 808. Then, when a session with the message & media storage 4000 is generated in step 810, an operation is performed in a session generation state in step 812, such that the session generation operation is completed. Subsequently, when the client #A-2 1100 logs in the message & media storage 4000 in step 814, the transition to a login state is made in step 816. When a storage space of the message & media storage 4000 is selected in step 818, an operation is performed in a selection state in step 820. When a session history retrieval operation must be performed in the message & media storage 4000 in step 822, the client #A-2 1100 retrieves a session history in step 824. Accordingly, when the session history is transmitted from the message & media storage 4000 in step 826, the session history is received in step 828. When a screen output operation is performed in step 830, the received session history is output on the screen of the client #A-2 1100. Accordingly, the session history is rendered in step 832.

Figure 13:
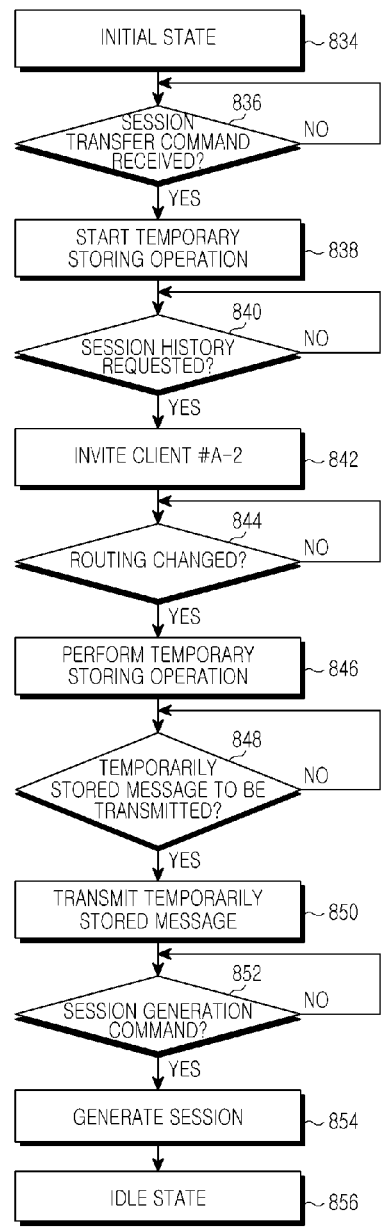
FIG. 13 is a state diagram of a conversation server according to the third exemplary embodiment of the present invention.

FIG. 13 illustrates the state variation of the conversation server 3000. When the conversation server 3000 of an initial state in step 834 receives a session transfer command from the client #A-1 1000 in step 836, a temporary storing operation is started in step 838. After pre-requesting the message & media storage 4000 to provide the session history in step 840, the conversation server 3000 invites the client #A-2 1100 in step 842. Then, when a routing change to the client #A-2 1100 is made in step 844, the conversation server 3000 performs a temporary storing operation in step 846. Subsequently, when the conversation server 3000 must transmit the temporarily stored message to the client #A-2 1100 in step 848, the temporarily stored message is transmitted to the client #A-2 1100 in step 850. Subsequently, when the message transmission is completed, the conversation server 3000 determines that a session generation command is needed in step 852 and operates in an idle state in step 856 after commanding the client #A-2 1100 to generate a session with the message & media storage 4000 in step 854.

FIG. 14 illustrates the state variation of the message & media storage 4000. When the message & media storage 4000 is in an initial state in step 858 and the client #A-2 1100 performs a login operation in step 860, the message & media storage 4000 operates in a login state in step 862. Subsequently, when a storage space of the message & media storage 4000 is selected in step 864, the message & media storage 4000 operates in a selection state in step 866. Subsequently, when a session history is retrieved from the message & media storage 4000 in step 868, the message & media storage 4000 operates in a session history retrieval state in step 870. Then, when the session history must be transmitted to the client #A-2 1100 in step 872, the message & media storage 4000 performs an operation for transmitting the session history to the client #A-2 1100 in step 874. When the transmission is completed in step 876, the message & media storage 4000 operates in an idle state in step 878.

In the case of a source device initiated session transfer flow model in which a session history is transmitted in a background manner according to the second exemplary embodiment of the present invention and a source device initiated session transfer flow model in which the client directly receives a session history from the message & media storage 4000 according to the third exemplary embodiment of the present invention, a waiting time of the user B can be minimized by minimizing a session transfer time with only a session generation time in the conversation server 3000. Accordingly, after session history transmission is completed through session media transmission immediately after the user A performs the session transfer, the session history can be referred to, such that the user A can refer to the session history during the conversation.

While the session transfer between multiple clients is in progress, for example, while the session transfer is in progress when the user A makes a request for transferring the session to another client of the user A, the user B holding a conversation with the user A does not know this situation. Thus, the session transfer according to the exemplary embodiment of the present invention can be referred to as transparency session transfer. For the transparency session transfer, it must be ensured that data from the user B to the user A safely arrives at the client #A-2 1100 without data loss. In the present invention, the transparency session transfer is ensured through the temporary storing technique.

Specifically, from the moment when the user A requests the session transfer and sends its notification to the conversation server 3000, the conversation server 3000 intercepts and temporarily stores data, for example, a message, transmitted from the user B. Subsequently, the conversation server 3000 must generate a session with the client #A-2 1100 and make a routing change. The temporary storing operation is terminated and the temporarily stored message is transmitted to the client #A-2 1100. Thus, the message transmitted by the user B is transmitted to the user A in the temporarily stored message form without omission.

As is apparent from the foregoing description, according to exemplary embodiments of the present invention, session transfer is naturally performed without lost content by temporarily storing and transmitting a session history and a message of a counterpart user to a second client during the session transfer. In a target client to which the session has been transferred, a session history of an existing client is output to a screen, such that a user can continue a conversation while referring to existing conversation content. The user does not need to read conversation content from the screen of the previous client. User convenience can be improved using a CPM service.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A conversation server for transferring a session between multiple clients, the server comprising:
   a storage configured to temporarily store a message from a third client of another user to a first client when the first client requests session transfer to a second client; and
   a controller configured to generate a session with the second client, transmit the temporarily stored message to the second client, and command the second client to generate a session between the second client and a message and media storage so that the second client can acquire a session history from the message and media storage,
   wherein the session history includes all types of data exchanged between the first client and the third client.

2. The conversation server of claim 1, wherein after changing routing setup to the second client when the session with the second client is generated completely, the controller terminates the temporarily storing operation and terminates a session with the first client.

3. The conversation server of claim 1, wherein the controller commands the second client by transmitting a session generation command to the second client, wherein after the second client generates the session with the message and media storage in response to the session generation command, the second client acquires the session history from the message and media storage.

4. The conversation server of claim 1, wherein the second client uses IMAP to acquire the session history.

5. A method for transferring a session between multiple clients in a service system implemented through an SIP/IP core network, the method comprising:
   temporarily storing, by a converged server, a message from a third client to a first client when the first client requests session transfer to a second client;
   generating a session with the second client;
   transmitting the temporarily stored message to the second client; and
   commanding the second client to generate a session between the second client and a message and media storage so that the second client can acquire a session history from the message and media storage.

6. The method of claim 5, further comprising:
   terminating the temporary storing operation after changing routing setup to the second client when the session with the second client is generated completely; and
   terminating the session with the first client.

7. The method of claim 5, wherein commanding the second client to generate a session with the message and media storage comprises:

transmitting a session generation command to the second client, wherein, in response to the session generation command, the second client generates the session with the message and media storage and acquires the session history from the message and media storage.

8. The method of claim 5, wherein the second client uses IMAP to acquire the session history.

\* \* \* \* \*